United States Patent
Gieck

(10) Patent No.: US 7,660,343 B1
(45) Date of Patent: Feb. 9, 2010

(54) METHOD FOR OPTIMIZING THE TRANSMISSION OF DATA VIA LINES

(75) Inventor: Reiner Gieck, Germering (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 715 days.

(21) Appl. No.: 10/048,119

(22) PCT Filed: Jul. 28, 2000

(86) PCT No.: PCT/DE00/02505

§ 371 (c)(1),
(2), (4) Date: Jun. 10, 2002

(87) PCT Pub. No.: WO01/10074

PCT Pub. Date: Feb. 8, 2001

(30) Foreign Application Priority Data

Jul. 30, 1999 (DE) ................ 199 35 997

(51) Int. Cl.
*H04B 1/38* (2006.01)
(52) U.S. Cl. .................... 375/222; 375/224
(58) Field of Classification Search ........... 375/224, 375/225, 227, 257, 260, 262, 377, 222
See application file for complete search history.

(56) References Cited

U.S. PATENT DOCUMENTS

| 5,715,277 | A | * | 2/1998 | Goodson et al. | 375/222 |
|---|---|---|---|---|---|
| 5,914,993 | A | * | 6/1999 | Lepitre et al. | 375/377 |
| 6,246,694 | B1 | * | 6/2001 | Chen | 370/468 |
| 6,246,695 | B1 | * | 6/2001 | Seazholtz et al. | 370/468 |
| 6,389,056 | B1 | * | 5/2002 | Kanterakis et al. | 375/130 |
| 6,389,065 | B1 | * | 5/2002 | McGhee | 375/222 |
| 6,389,066 | B1 | * | 5/2002 | Ejzak | 375/224 |
| 6,546,046 | B1 | * | 4/2003 | Sweitzer et al. | 375/225 |
| 6,549,520 | B1 | * | 4/2003 | Gross et al. | 370/242 |
| 6,798,855 | B1 | * | 9/2004 | Zirwas | 375/354 |
| 6,891,854 | B2 | * | 5/2005 | Zhang et al. | 370/468 |
| 2001/0043568 | A1 | * | 11/2001 | Mchale et al. | 370/254 |
| 2003/0016794 | A1 | * | 1/2003 | Brothers | 379/90.01 |

\* cited by examiner

*Primary Examiner*—Chieh M. Fan
*Assistant Examiner*—Freshteh N Aghdam
(74) *Attorney, Agent, or Firm*—Laurence A. Greenberg; Werner H. Stemer; Ralph E. Locher

(57) ABSTRACT

For different line parameters of lines at least one transmission procedure with a transmission rate representing the maximum throughput rate is determined and stored. In a current data transmission via a line, its line parameters are measured and the transmission procedure is selected with the transmission rate at which the greatest agreement is determined between the measured and stored line parameters, i.e., a maximum data throughput rate.

9 Claims, 1 Drawing Sheet

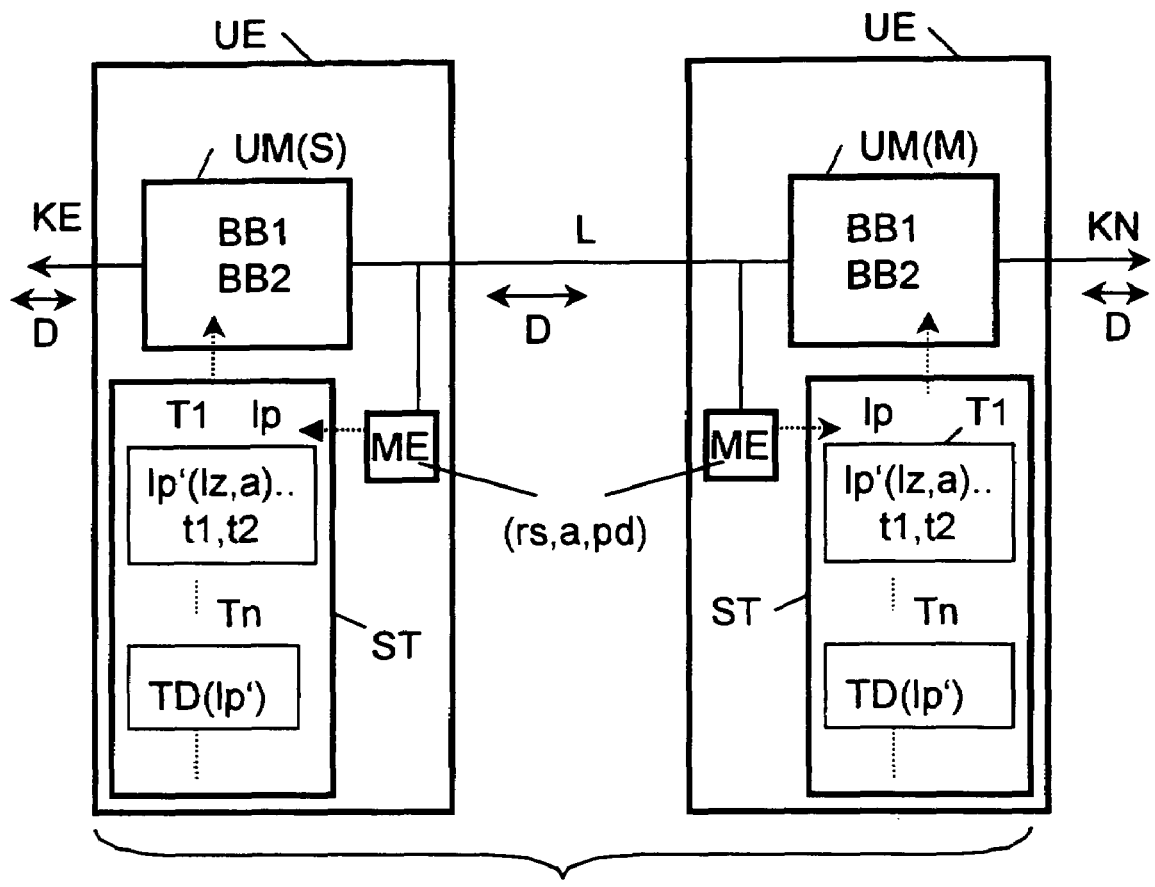
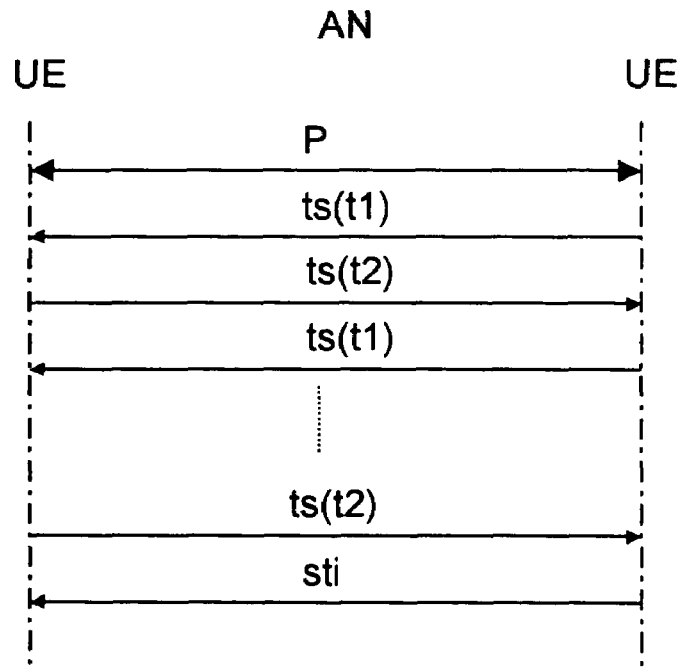

METHOD FOR OPTIMIZING THE TRANSMISSION OF DATA VIA LINES

CLAIM FOR PRIORITY

This application claims priority to International Application No. PCT/DE00/02505 which was published in the German Language on Feb. 8, 2001.

TECHNICAL FIELD OF THE INVENTION

The invention relates to a method for optimizing data transmission.

BACKGROUND OF THE INVENTION

In the service area or feeder nets of communications systems or networks, different transmission procedures are used to transmit data. For example, digitized voice information or Internet data information via lines may be transmitted via 2-wire or 4-wire lines. Frequently used transmission procedures include the baseband transmission procedure and single-carrier or multi-carrier procedures. Additional echo compensation processes are required for bi-directional data transmission via two-wire lines. Modems frequently use single- or multiple carrier frequency processes, whereby appropriate modulation procedures—in particular phase modulation procedures—depending on the transmission rates to be achieved, are applied.

Modems use a default transmission rate that is reduced during temporary interference, which causes a sharp drop in transmission quality. Once the interference is eliminated or repaired, the modem returns to the original transmission rate.

SUMMARY OF THE INVENTION

The invention improves transmission via lines, in particular service lines to communications systems.

One aspect of the invention includes being able to determine and store at least one transmission procedure with a transmission rate representing the maximum throughput rate for different line parameters of lines.

Current line data transmission, via a line, measures line parameters, and a given transmission procedure selects a given transmission rate with the best match between measured and stored line parameters. In this respect, the line parameters are represented by line damping and runtime and by interfering signals on a line.

In one embodiment of the invention, use of a line or service line is optimized by determining maximum data throughput because in the event of error-free maximum data throughput, data throughput depends on the transmission procedure used on a given line or transmission line with interfering signals. In this context, the highest transmission rate with a given transmission procedure does not equal the greatest data throughput.

BRIEF DESCRIPTION OF THE DRAWINGS

The invention is described below using a drawing, in which:

FIG. 1 shows a block diagram of a feeder network in a communications network.

DETAILED DESCRIPTION OF THE PREFERRED EMBODIMENTS

FIG. 1 shows a block diagram with a feeder network AN of a communications network KN, representing, for example, an ISDN communications network or a data communications network such as the Internet. A two-wire line L is supplied with the AN service network, with a transmission unit UE connected to both ends—in the example this is represented by several lines. A transmission module UE is supplied and connected to the line L and the communications transmitter KE in the transmission unit UM, whereby the transmission module UM can, for example, take the form of two transmission procedures such as two different baseband procedures BB1, BB2 with an echo compensation procedure. Alternatively, for example, single- or multi-carrier frequency procedures such as the OFDM transmission procedure, are possible. A measuring unit ME connected to the line L and a control unit ST are provided in the transmission module UM to measure the line parameters lp of line L.

In the lower area, a dotted line represents the transmission units UE to illustrate the exchange of information.

A preamble P is sent between the transmission modules UM before determining the line parameters (lp) and a procedure is used to switch the two transmission modules UM to the measuring procedure. In this connection, the preamble P information and the procedure are determined using a low transmission rate compared to the following measuring procedure and a simple transmission procedure—for example two-stage phase difference modulation or binary frequency modulation—, so that transmission of information is assured even along lines L with low transmission quality, whereby the echo compensation procedure is switched off for a two-wire line L.

Measuring the line parameters lp, i.e., the measuring procedure, can be performed as follows:

(a) a transmission module UM is designated as master (M) or as master transmission module UM (M)—preferably in communications system KS—and the other transmission module UM as slave (S) or decentralized transmission module UM (S).

(b) In each of the two transmission modules UM, the interference in line L, i.e., the noise floor signal ts, is measured using measuring unit ME, analyzed for amplitude and frequency, and the results of these analyses saved. Based on the results of the analysis, the master (M) makes an initial selection for a possible transmission procedure BB1, BB2. If the noise floor signal rs includes high-level signal frequencies, a transmission procedure BB1, BB2 is initially selected at which these signal frequencies produce no interference.

(c) Using a transmitting preamble P, the slave (S) is informed by coded information which transmission procedure BB1, BB2 and which transmission rate are provided in the measuring procedure.

(d) The selected transmission procedures BB1, BB2 are assigned tables T in two transmission modules UM, which are selected by the currently used transmission procedure BB1, BB2 from a majority of tables T1 . . . Tn that are saved in the transmission modules UM.

(e) The master (M) sends a test signal ts with two frequencies and amplitudes for a given time t1, whereby the frequencies and amplitudes and the times are determined by the table T.

(f) In the slave (S) the amplitudes a of the received test signal ts are measured for individual frequencies and the phase difference pd of the frequencies of the test signal ts are measured using the measuring unit ME. The phase difference fd can be used to determine runtime lz, which are saved along with the measured values of amplitudes a.

(g) Then the slave (S) and the master (M) send out a test signal ts for the given time t2.

(h) The master (M) also determines for each frequency the amplitudes of test signal ts and the phase difference pd using measuring unit ME and runtime lz. Furthermore, the received test signal ts is checked for maximum allowable damping.

If the damping is below that point, the master (M) will transmit an additional test signal ts with two frequencies and amplitudes for a given time t1 to slave S via the line L, whereby the frequencies and amplitudes and time spans t1, t2 again are determined by the table T.

(i) The evaluation described in (g) and (f) is again carried out in the slave (S).

The procedures described in e) through h) are repeated until the frequencies and/or pairs of frequencies in the assigned table T are tested. In this manner, line L is tested in a grid of frequencies. In this regard, the master (M) stops measuring if a test signal ts frequency in the table has too high damping, i.e., line damping. Based on a decision table in the master (M), the slave (S) is informed for which new transmission procedures BB1, BB2 and at which transmission rate the following measurements are to be carried out. The transmission modules UM select from the tables T and the measurement is assigned. This way several transmission procedures BB1, BB2 are tested and transmission rates are tested, and frequency ranges that are suitable for data transmission in addition to commensurate transmission rates are determined.

To determine transmission procedure BB1, BB2 with the maximum throughput rate, the analysis results are compared with table TD, in which the frequencies and frequency ranges are stored for various transmission procedures BB1, BB2 for different transmission rates, and then those are determined in which the lowest possible damping and runtime distortions occur based on their spectrum. The transmission procedure or procedures chosen are those in which the tested frequency range have the lowest fluctuations in measured damping and runtime lz and, moreover, in which the measured noise floor signal rs has the least effect on throughput rate. The values stored in the tables for the comparisons are determined empirically with a wide variety of transmission procedures and line properties at different frequencies and frequency ranges in test rigs, for example in a test setup. The maximum throughput rate can equal the maximum possible transmission rate, it can however be lower, in particular in the event of heavy interference and/or noise floors that necessitate repeated transmittal of data containing interference. That means that an optimum transmission rate will be determined in which the data throughput rate is optimal The maximum data throughput rate can also be set at differently measured line parameters lp and different transmission procedures BB1, BB2 by, for example, measuring the error rate and data packet repeat rate.

After selecting the transmission procedure BB1, BB2, corresponding control information sti is sent to transmission module UM, where the selected transmission procedure BB1, BB2 is set. The selection of the suitable transmission procedure BB1, BB2 with optimum transmission rate can be done with every operation of the transmission units UE or at the initial operation of a line L.

The procedure according to the invention is not limited to one embodiment, but can be applied to a wide variety of transmission procedures—for example different single- or multi-carrier frequency procedures with different carrier modulations, and for a wide range of line types (2-wire and 4-wire line).

What is claimed is:

1. A method of data transmission, comprising:
   determining and storing at least one transmission method, with at least one transmission speed that represents a maximum data throughput rate, in a table saved in at least two transmission units, for different parameters of lines;
   in the two transmission units, measuring and analyzing interference of a line connecting the two transmission units;
   in one of the two transmission units, selecting at least one transmission method based on the analysis;
   using the two transmission units to measure line parameters of the line using the at least one transmission method;
   in at least one of the transmission units, comparing the measured line parameters with the line parameters stored in the table; and
   in at least one of the transmission units, determining and selecting the transmission method having a transmission speed as a function of the comparison;
   wherein before the start of a data transmission, a measurement procedure is initiated, the procedure comprising:
   determining which end of the line is a central end and which end of the line is a decentral end,
   measuring interference of the line before other ones of the line parameters are measured at the central end,
   selecting and reporting a transmission method to the decentral end,
   sending a predetermined test signal by the central end, at two different frequencies, based on the line parameters stored in memory for the selected transmission method, and the line parameters of the test signal are measured by the decentral end, and a test signal is transmitted to the central end by the decentral end,
   checking an attenuation of the test signal at the central end, and, as function of the measured attenuation, additional test signals at two different frequencies are transmitted to the decentral end, wherein the attenuation is one of the line parameters and
   repeating the sending and checking until the line parameters stored in memory have been worked off.

2. The method according to claim 1, wherein the line parameters include a running time of the line and interference signals on the line.

3. The method according to claim 2, wherein the running time is determined by a measurement of the phase difference between two signals with different frequencies, one of the two signals formed according to the transmission method.

4. The method according to claim 1, wherein the maximum data throughput rate for different line parameters is determined with different transmission methods and transmission speeds, by selecting the transmission methods in the frequency range of which the line parameters of attenuation and running time demonstrate the least amount of variations, and in which the interference of the measured interference signal has the least effect, and the line parameters that represent the maximum throughput rate are stored in memory.

5. The method according to claim 1, wherein the line parameters stored in memory are stored in tables, such that the tables are assigned to the different transmission methods with different speeds, and the selection of a transmission method for determining the line parameters and for determining the transmission method with the maximum throughput rate occurs by a comparison of the determined line parameters stored in the tables.

6. The method according to claim 5, wherein transmission units are each connected at ends of the line, where a communications terminal is connected to one transmission unit, and a communications system is connected to the other transmission unit.

7. The method according to claim 6, wherein the transmission methods are represented by synchronous or asynchronous base band transmission methods, or by a single-carrier or multi-carrier frequency transmission method.

8. The method according to claim 7, wherein the baseband transmission methods include methods that are selected from the group consisting of an alternate mark inversion method, a high density bipolar order 3 encoding method, a coded diphase method, and a 2 binary 1 quaternary method; and the carrier frequency transmission method is selected from the group consisting of a quadrature amplitude modulation method with different step numbers and a phase difference method.

9. The method according to claim 1, further including the step of determining in a test set up and storing in the table, a wide variety of transmission procedures and line properties at different frequencies and frequency ranges.

* * * * *